Nov. 20, 1934.   G. COLUCCI   1,981,582
FRICTION CHANGE SPEED GEARS
Filed Oct. 17, 1932   3 Sheets-Sheet 1
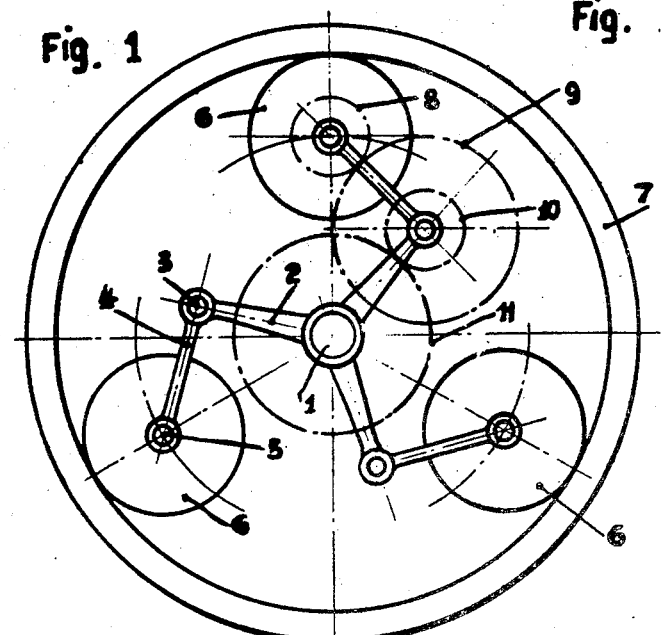
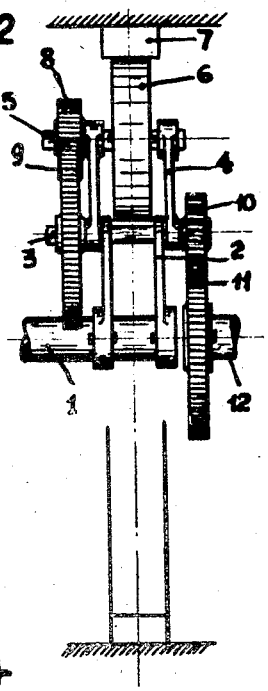
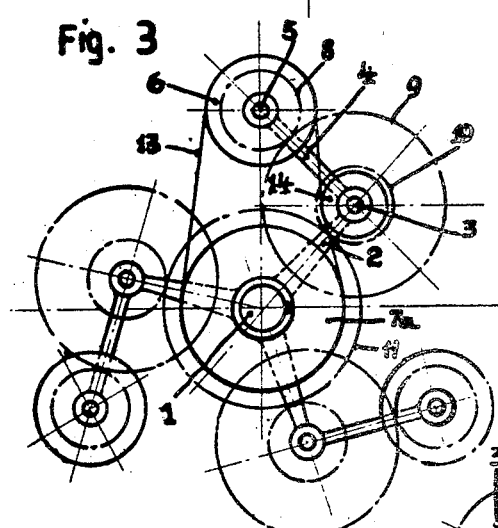
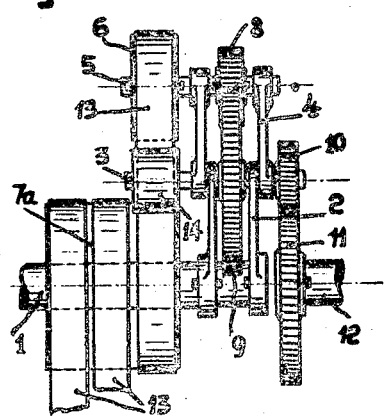
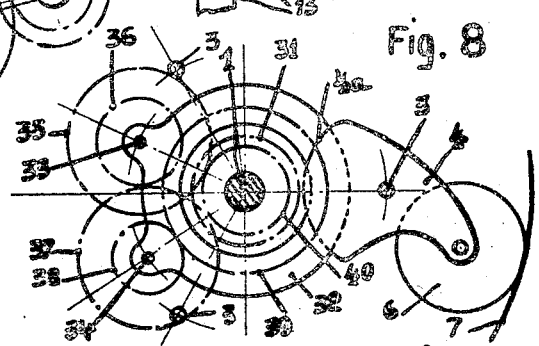
Inventor
Giuseppe Colucci.
By Sommers & Young Attys.

Nov. 20, 1934.  G. COLUCCI  1,931,582
FRICTION CHANGE SPEED GEARS
Filed Oct. 17, 1932  3 Sheets-Sheet 2
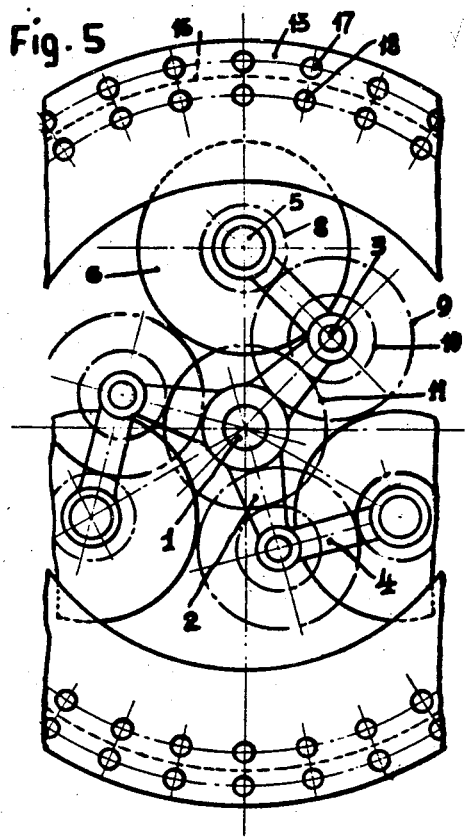
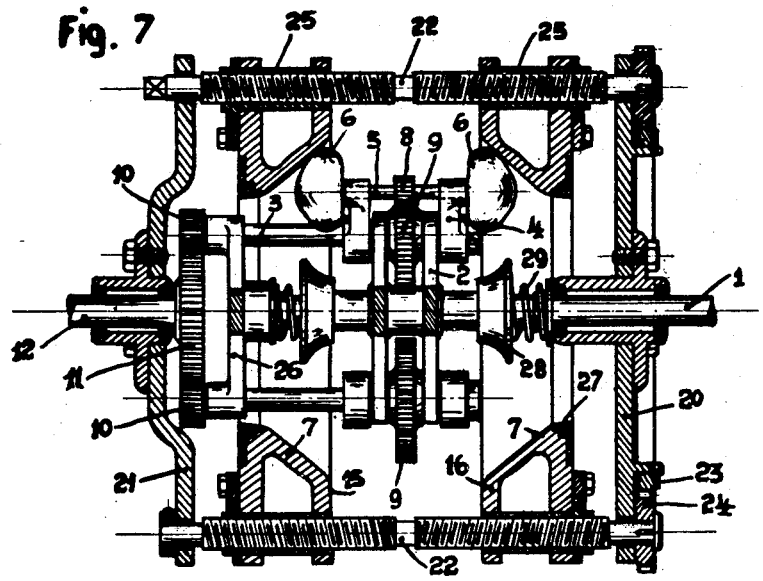

Nov. 20, 1934.  G. COLUCCI  1,981,582
FRICTION CHANGE SPEED GEARS
Filed Oct. 17, 1932  3 Sheets-Sheet 3

Inventor
Giuseppe Colucci
by Sommers & Young
Attys

Patented Nov. 20, 1934

1,981,582

UNITED STATES PATENT OFFICE 1,981,582

FRICTION CHANGE SPEED GEARS

Giuseppe Colucci, Naples, Italy

Application October 17, 1932, Serial No. 638,248
In Italy October 19, 1931

5 Claims. (Cl. 74—260)

This invention relates to a friction change speed gear adapted to be interposed between shafts rotating in a gradually variable speed ratio, in which the adherence is produced by the centrifugal force of rollers set in rotation by the engine shaft and rolling on a cylindrical or conical fixed surface. When the surface is a cylindrical one, the variation in the transmission ratio is produced by varying its diameter and in this case the fixed cylindrical surface should be an extensible pulley or drum. When the surface is a conical one, the variation in the transmission ratio is obtained by causing the rollers to roll on one or the other cone section; in this case either the cone or the rollers are capable of axial displacement.

The number of rollers can obviously be increased to a multiple and the fixed surface or race can be enlarged according to the transmission requirements.

According to a preferred embodiment of this invention, each roller is carried by a swingable arm articulated to an arm of the engine shaft, both arms forming together a toggle. The centrifugal force pushes the roller against the fixed race and presses it against this latter under a pressure which can easily be calculated, as it depends, as is well known, from the rotating mass, the rotation radius and the square of the angular speed. The roller is caused by adherence to roll on the fixed race and its rotary motion is transmitted by an epicycloidal sun and planet gear to the driven shaft arranged co-axially to the driving shaft. In order to transmit a considerable power, it will be useful to provide means by which the transmission from the roller to the driven shaft is considerably reduced in the number of turns; for this purpose I arrange on the toggle axis a countershaft with double intermediate pinion.

According to a further embodiment of this invention, the fixed surface on which the roller is pressed can be the surface of a belt, cable or chain which is wound up at one end on a pulley or stationary wheel variable in diameter and concentrical to the axis of the shafts, while it is wound up at its other end on the roller.

The invention is diagrammatically shown on the accompanying drawings, on which:

Figures 1 and 2 show in front view and in side view, respectively, a device with cylindrical friction surfaces.

Figures 3 and 4 show in front and side view, respectively, a belt friction device.

Figures 5 and 6 show a device with conical friction surface in front and side view, respectively.

Figure 7 shows in axial section the mode of carrying out the device shown diagrammatically in Figures 5 and 6.

Figure 8 shows a supplementary appliance for the previously mentioned devices.

Figure 6:
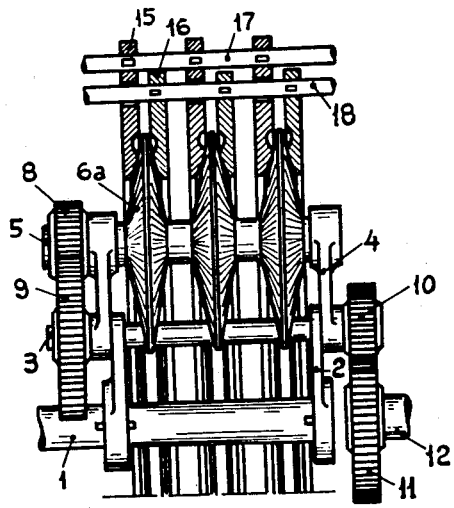

Referring to Figures 1 and 2, a sleeve provided with arms 2 is arranged on the engine shaft 1. A swingable arm 4 is articulated to each of the arms 2 by means of a pin 3, thus forming a toggle. The swingable arm 4 carries at its free end the pin 5 of the roller 6 which is pressed by the centrifugal force against the cylindrical inner surface of a drum 7 variable in diameter. The roller 6 adheres under the pressure due to the centrifugal force to the inner surface of the drum 7 and rolls thereon. The rotation of the roller is transmitted to the driven shaft 12 by means of two gearings 8—9 and 10—11, of which the first gear is smaller in diameter and secured to the roller, while the last one is larger in diameter and is secured to the shaft. The two intermediate wheels 9—10 of the said gearings are solidly connected together, being keyed on the pin 3.

For the sake of clearness the wheels are shown on Figure 1 only for one arm and in Figure 2 only the upper arm is shown.

The transmission ratio between the shaft 1 and the shaft 12 depends obviously upon the product of the ratios $D:d$ between the diameter $D$ of the drum 7 and the diameter $d$ of the roller 6, multiplied by the constant coefficient of transmission due to the gearing 8—9—10—11. The toothed wheels 9—10 of this gearing perform a revolution movement under the action of the engine shaft and a rotary motion about their own axis under the action of the roller 6, this rotation varying as the diameter $D$ of the cylindrical surface of the drum 7 varies.

It will be clear that by varying the diameter $D$ the value and the direction of the rotation of the toothed wheel 11, (and therefore of the driven shaft 12) due to the combined rotation and revolution of the double pinion 9—10, are varied, and with suitable values of the diameter $D$ the driven shaft will remain stationary or rotate in a direction opposite to the engine shaft 1.

With the same gear the pressure of the roller 6 on the drum 7 varies with square of the rotation speed of the engine shaft, and the transmissible power varies therefore with the third power of the angular speed, as well as with the diameter $D$ of the cylindrical surface, i.e. with the revolution radius of the rollers. The power transmissible by the mechanism increases as the ratio $k = r_9 r_{11} / r_8 r_{10}$, wherein $r_8$, $r_9$, $r_{10}$, $r_{11}$ denote the radii of the toothed wheels 8, 9, 10, 11. This is a property of the transmission by means of epicycloidal gear and it is a characteristic feature of this invention, as it is thereby possible to transmit through mechanisms of small size a considerably high power.

In the construction shown in Figures 3 and 4 the mechanism includes the same members; however, the drum 7 arranged externally of the roller path is replaced by a fixed pulley 7a variable in diameter and placed internally of the roller path. The rollers 6 are connected with the belt pulley 7a by means of a belt 13 which is held stretched by the rollers through the centrifugal force. This construction is obviously substantially equivalent to the diagram of the preceding figures. A pulley 14 is loosely mounted on the pivot 3 and the belt 13 rests on said pulley when the toggle 2—4 is extended in such manner that its pin would come on the path of the belt.

Figure 6A:
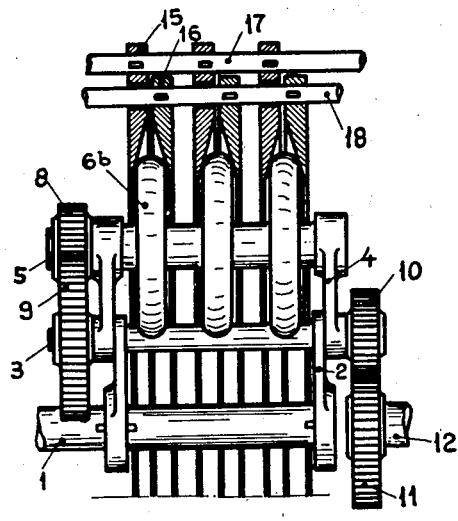
Figure 6a shows a modification of the construction shown in Figure 6.

Figure 5, 6 and 6a show a device substantially similar to those previously described, wherein conical, conoidical or similar surfaces are employed instead of the extensible drum or pulley. In Figure 6 the rollers are conical; in the construction according to Figure 6a the fixed surfaces are of conical shape.

In the front view this device appears similar to the one shown in Figure 1, with the exception, that the drum 7 is now replaced by a circular groove formed by two discs 15 and 16 which can be brought towards or caused to recede from each other in an axial direction. While in the construction according to Figures 1 and 2 the adherence takes place along the generatrix of each roller, and in Figures 3 along an extensive cylindrical surface, adherence now takes place only at one point of each conical surface. In order to multiply the number of these points it is useful to increase the number of the rollers. In the construction diagrammatically shown in Figures 6 or 6a, every pin 5 carries three rollers 6a or 6b which adhere at two points to the pairs of discs 15—16. The discs 15 are fixedly connected with the rods 17 and the discs 16 with the rods 18; if the two rods are longitudinally displaced in opposite directions the discs recede from or approach each other, i.e. the groove into which the rollers 6a or 6b are forced by the centrifugal force is enlarged or reduced. When the rollers 6a are made conical as shown in Figure 6, the enlargement of the groove is equivalent to the reduction of the roller radius, or, more exactly, of their rolling circle, while the radius of the discs remains constant. Conversely, if the disc surfaces are e.g. conical, as shown in Figure 6a, the receding of the discs from each other is equivalent to the increase of the radius of the circle on which the rollers 6b roll, the radius of the rollers remaining constant. In the former case the receding of the discs 15—16 from each other and in the latter case the approaching of the same correspond to a reduction in the transmission ratio and vice versa.

Figure 7 shows a change speed gear in longitudinal section on conventional plane according to the diagram shown in Figures 5 and 6 (lower portion). Two strong side walls 20 and 21 are connected together by rods, or form parts of a bow, and carry in suitable bearings the spindles 22 provided on half their length with a right-handed screw thread and on the other half with a left-handed screw thread. The spindles 22 are rotated simultaneously through the toothed wheel 23 meshing with the pinions 24 of the two spindles. Each half-spindle carries symmetrically the nuts 25 fixedly connected with the discs 15 and 16, respectively.

These latter are provided with conical inner surfaces 7 corresponding to the discs 15—16 according to Figure 6. It will be clear that on rotation of the toothed wheel 23 or of one of the pinions 24 the two discs are caused to recede from or to approach each other. The axis of the conical surfaces is at the same time the axis of the engine shaft 1 and of the driven shaft 12, of which the former is mounted by means of a bearing in the side wall 20 and the latter is similarly mounted in the wall 21. The engine shaft 1 extends between the two side walls and carries centrally thereof a sleeve with three pairs of pivot arms 2, each of which is provided with a pivot 3 and pinion 9. A pair of swing arms 4 is articulated to the pivot 3 and carries the pivot 5 with the pinion 8, meshing with the pinion 9, and on both sides spheroidal masses 6 which are forced by the centrifugal force against the conical surfaces 7 to which they adhere rolling thereon. The pivots 3 reach the side wall 21 and carry at their ends the pinions 10 meshing with the toothed wheel 11 of the driven shaft. A second sleeve with arms 26 adapted to support the ends of the pivots 3 is arranged on the end of the engine shaft 1.

In connection with the working of the device shown in Figure 7, reference shall be made to the constructions shown in Figures 1 to 6a, the corresponding parts in all these figures are indicated by the same reference numerals. The highest speed of rotation of the driven shaft 12 is attained with the smallest distance between the discs 15 and 16, i.e. with the smallest radius of revolution of the masses 6 or, in other words, with the smallest angle of the toggle 2, 4.

The construction according to Figure 7 is shown in the position corresponding to the highest speed of the driven shaft equal to the speed of rotation of the engine shaft, i.e. to "top gear". In this position owing to the approaching of the two discs 15 and 16 under the action of the spindles 22, the masses 6 are clamped between the rings 27 rotating in said discs and the tapered sleeves 28 of the engine shaft. In these conditions no rolling takes place, the whole gearing being rotated like a single unit fly-wheel supported by the discs 15, 16. The rollers are displaced from the conical surfaces 7 to the inner surfaces of the rings 27 smoothly and without shocks, the former surface gradually merging into the latter.

The clamping of the spheroidal masses 6 between the rings 27 and the tapered sleeves 28 is improved by the action of the springs 29 which on approaching of the discs 15, 16 are compressed and tend to remove the masses 6 from the shaft axis pressing them against the rings.

In order to ensure a smooth change from top gear to the first transmission ratio of the change speed gear, the inner surface of the rings 27 is made slightly conical. Moreover, the tapered sleeve 28 is shaped in such manner as to clamp the spheroidal mass at a plurality of points, thus braking it more efficiently in its rotation.

The change of the transmission ratio between the angular speed of the engine shaft 1 and the driven shaft 12 is effected by going over in a perfectly continuous manner from the smallest or even zero value to the highest positive value by approaching the discs 15, 16 to each other, and in reverse by going over from zero to the highest negative value by causing the discs to recede from each other.

In the gears shown the adherence between the fixed surfaces and the surfaces rolling on the former is effected exclusively through centrifugal force and it varies therefore with the square of the angular speed of the engine shaft. Therefore, if the speed of this latter falls considerably under the normal value for which the gear has been calculated, the value of the transmitted power is reduced by a considerably greater extent than the value of the said angular speed. If it is desired to maintain a considerably high value of the adherence even at speeds considerably smaller than the normal speed, it will be useful to complete the action of the centrifugal force by a mechanical, hydraulic, magnetic or other action.

Figure 9:
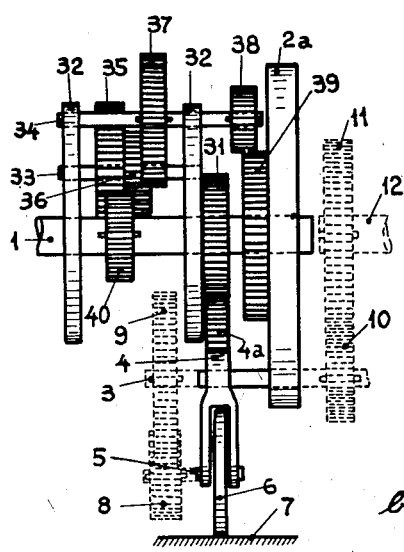
Figure 9 is a side view of the device shown in Figure 8.

Figures 8 and 9 show an arrangement adapted to work for the above mentioned purpose. The disc 2a carrying the pivots 3 for the swingable arms 4 of the toggle is not keyed on the engine shaft 1, but is loosely mounted thereon. The swingable arms 4 carrying the rollers 6 by means of pins 5 are provided at their inner end with a toothed sector 4a meshing with the toothed wheel 31 of the discs 32 loosely mounted on the engine shaft 1.

The discs 32 carry the pivots 33, 34 of the double pinions 35, 36 and 37, 38, of which the pinions 36 and 37 mesh together. The smaller wheel of one of the double pinions meshes with the large toothed wheel 39 secured to the disc 2a. The large toothed wheel 35 of the other double pinion meshes with the toothed wheel 40 keyed on the engine shaft 1. The toothed sectors 4a of all the arms 4 are in engagement with the same toothed wheel 31, and the gear can therefore be made up merely of the double pinion pairs mentioned above.

The working of the device is as follows:

The engine shaft 1 does not carry along in rotation directly the disc 2a with the pivots 3 of the swingable arms 4, but it drives through its toothed wheel 40 the toothed wheel 35, which transmits motion through the kinematic connection 35—36—37—38 to the wheel 39 thereby moving the discs 32 with its toothed wheel 31. The swingable arms 4 are therefore subjected to a moment of rotation about the pivots 3 and cause the rollers to adhere to the fixed cylindrical or conical surfaces 7 and to roll on these latter. The disc 2a carrying the pivots after a certain angular displacement is rotated with the engine shaft 1 as if it were keyed on this latter and similarly all the other toothed wheels will rotate with the engine shaft 1, with the result that the roller 6 rolls on the corresponding stationary surface 7 to which it adheres owing to the pressure exerted by the engine shaft and depending exclusively upon the driving moment as well as owing to the centrifugal force depending only upon the speed of rotation of the shaft. In this manner at least a minimum adherence is ensured in every case.

What I claim is:

1. Friction change speed gear comprising, in combination with a driving shaft and a driven shaft, a pair of rings facing each other and forming between them a substantially conical roller race, rollers adapted to roll in said roller race, toggles for connecting said rollers to said driving shaft so as to be carried along in rotation about said driving shaft and said rollers carried by centrifugal force into engagement with said roller race, a double pinion of different diameters loosely mounted on the toggle pin, a toothed wheel secured to each of said rollers and meshing with the larger diameter rim of said double pinion, a toothed wheel carried by the driven shaft and engaging with the smaller diameter rim of said double pinion and means for varying the distance between the rings for varying the diameter of the path of said rollers in said roller race.

2. Friction change speed gear comprising, in combination with a driving shaft and a driven shaft, a pair of rings facing each other and forming between them a substantially conical roller race, rollers adapted to roll in said roller race, toggles for connecting said rollers to said driving shaft so that these latter are carried along in rotation about said driving shaft and said rollers brought by centrifugal force into engagement with said roller race, a double pinion of different diameters loosely mounted on the toggle pin, a toothed wheel secured to each of said rollers and meshing with the larger diameter rim of said double pinion, a toothed wheel carried by the driven shaft and meshing with the smaller diameter rim of said double pinion and means for varying the distance between the rings for varying the diameter of the path of said rollers in said roller race, a ring loosely mounted in the opening of each of said rings and means by which the said rollers are forced and locked into said loose rings whereby the driven shaft is directly driven by said driving shaft.

3. A friction change-speed gear comprising in combination with a driving shaft, a driven shaft, a fixed roller surface and rollers connected to the driving shaft so as to be brought by centrifugal force on said surface and caused to roll thereon by the rotation of said driving shaft, a transmission reducing gear operatively connecting said rollers to said driven shaft, and means for varying the diameter of said surface so as to effect a gradual variation of the transmission ratio.

4. A friction change-speed gear comprising, in combination with a driving shaft, a driven shaft, a fixed roller surface, rollers adapted to roll on said surface, toggles for connecting said rollers to said driving shaft so as to be carried along in rotation about said driving shaft and carried by centrifugal force into engagement with said roller surface, a transmission reducing gear operatively connecting together the axes of rotation of said rollers, the axes of articulation of the toggles and said driven shaft, and means for varying the diameter of said surface in order to effect a gradual variation of the transmission ratio.

5. A friction change-speed gear comprising, in combination, a driving shaft, a driven shaft, a fixed roller surface, rollers adapted to roll on said surface, toggles carrying said rollers and loosely mounted on said driving shaft, toothed sectors carried by the swing arms of said toggles, a toothed wheel meshing with said toothed sectors, a sleeve mounted concentrically on said driving shaft and carrying said toothed wheel, a toothed wheel carried by said toggles, a toothed wheel fixed on the driving shaft, double pinions carried by said sleeves for transmitting motion from the said driving shaft to said toothed sectors, a transmission reducing gear operatively connecting said rollers to said driven shaft, and means for varying the diameter of said surface in order to effect a gradual variation of the transmission ratio.

GIUSEPPE COLUCCI.